United States Patent [19]
Lieben et al.

[11] Patent Number: 5,982,875
[45] Date of Patent: *Nov. 9, 1999

[54] PROCESS AND APPARATUS FOR INTERACTION BETWEEN A TELEPHONE AND ITS USER

[75] Inventors: Jan Lieben, Winterswyk, Netherlands; Matthias Eberhard Jobst, Bochum, Germany

[73] Assignee: Nokia Mobile Phones, Limited, Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,991

[22] Filed: Jan. 29, 1997

[30] Foreign Application Priority Data

Jan. 31, 1996 [EP] European Pat. Off. ............... 96101369

[51] Int. Cl.$^6$ ...................................................... H04M 1/00
[52] U.S. Cl. ........................................ 379/350; 379/88.01
[58] Field of Search .............................. 379/67.1, 88.01, 379/89, 354, 355, 350; 704/270, 271, 272, 275

[56] References Cited

U.S. PATENT DOCUMENTS

| | | | |
|---|---|---|---|
| 4,731,811 | 3/1988 | Dubus | 379/58 |
| 4,757,525 | 7/1988 | Matthew et al. | 379/89 |
| 4,797,924 | 1/1989 | Schnars et al. | 381/43 |
| 5,479,476 | 12/1995 | Finke-Anlauff | 379/58 |

FOREIGN PATENT DOCUMENTS

| | | |
|---|---|---|
| 0 590 492 | 4/1994 | European Pat. Off. . |
| 40 08 598 | 9/1991 | Germany . |

OTHER PUBLICATIONS

Patent Abstracts of Japan, vol. 13, No. 212(P–873), Publication No. JP1029921, Kamiya Shin Jan. 31, 1989.
Patent Abstracts of Japan, vol. 18, No. 050(P–1683), Publication No. JP5274075, Sato Yoshiyuki Oct. 22, 1993.
Patent Abstracts of Japan, vol. 14, No. 222(E–0926), Publication No. JP2055449, Miyazono Kazuya Feb. 23, 1990.
"Annual Review of Communications" vol. 46, Jan. 1992.
Telecom Report, vol. 10, No. 2, 1987, Munchen.

*Primary Examiner*—N. Le
*Assistant Examiner*—Shih-wen Hsieh
*Attorney, Agent, or Firm*—Perman & Green, LLP

[57] ABSTRACT

The present invention relates to a telephone which has, on account of its many functions, a multistage menu structure for operator prompting. In order that a user does not have to remember the entire menu, or the point where he is in the menu at a given time if he pauses when operating the unit, there is specified a process for communication between the telephone and the user which, by means of a program, indicates to the user when he inputs a help signal a program branch previously selected by him and the next options available to him within this program branch. Furthermore, a voice dialling system for carrying out such a process is specified.

8 Claims, 15 Drawing Sheets

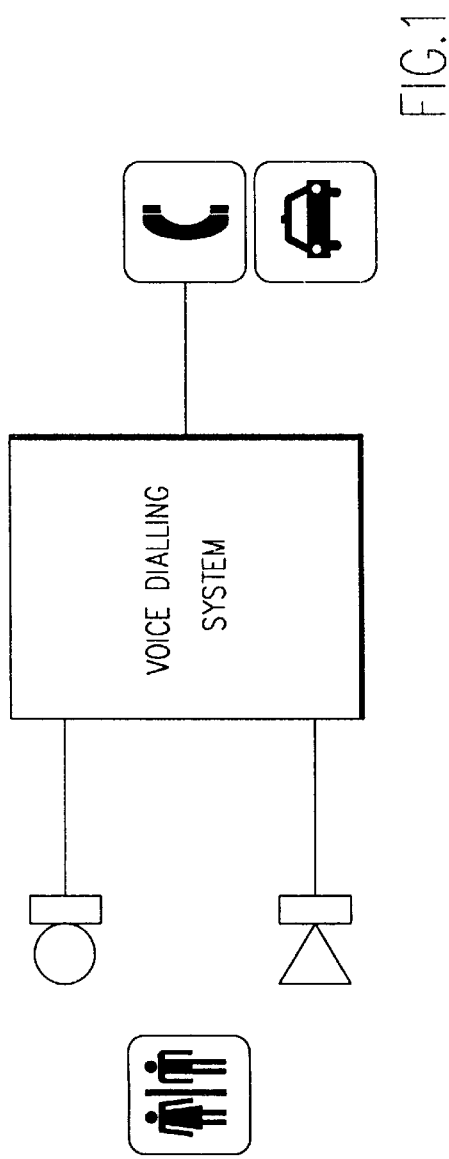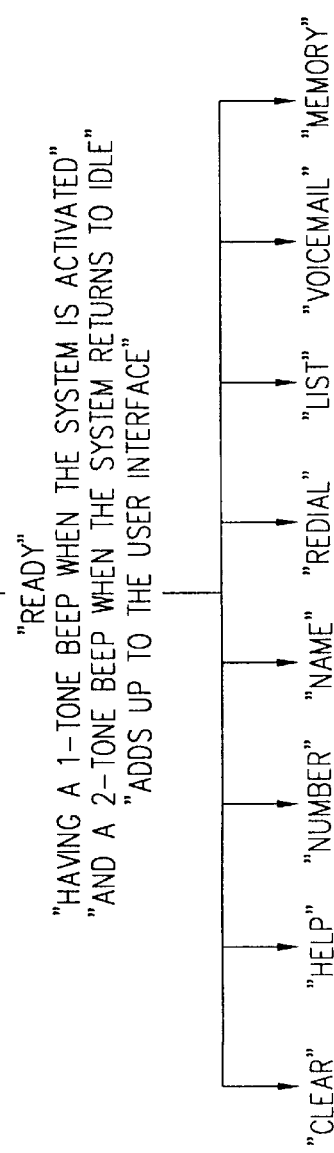

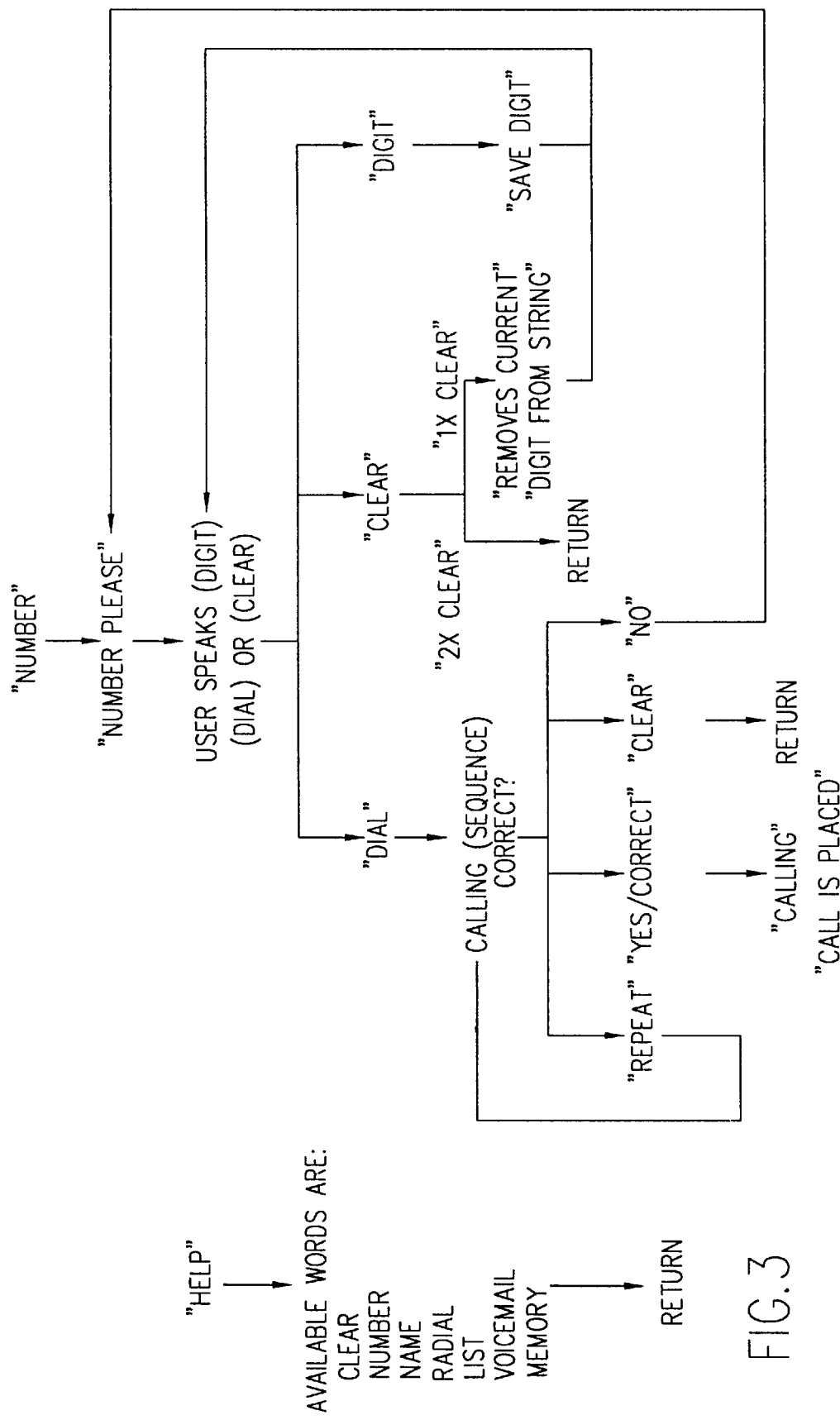

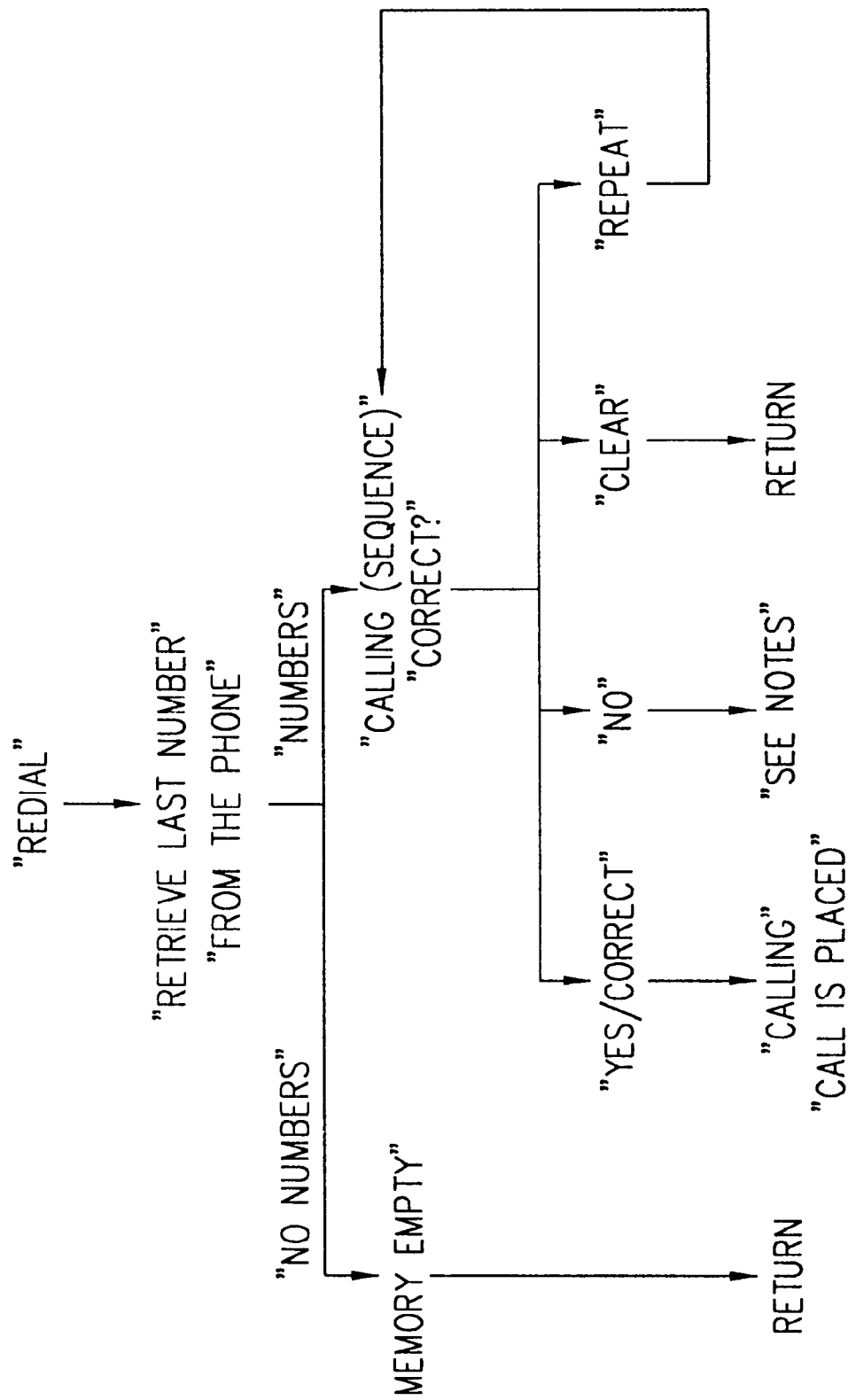

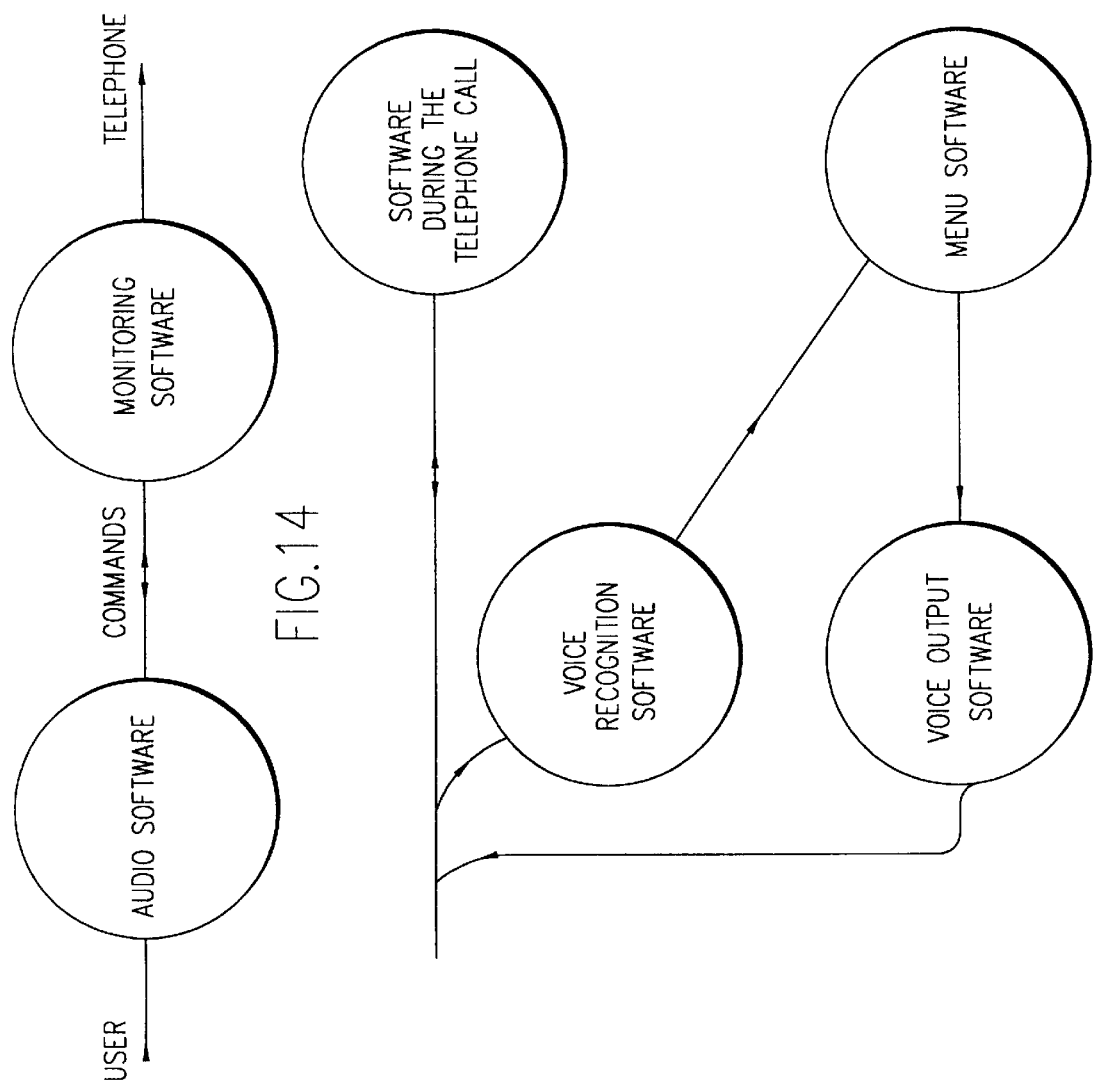

PROCESS AND APPARATUS FOR INTERACTION BETWEEN A TELEPHONE AND ITS USER

BACKGROUND OF THE INVENTION

The present invention relates generally to a voice-controlled telephone, in which the user can select between a broad range of functions. The present invention is concerned with a process and an apparatus for communication between the telephone and the user by means of a program.

Customary telephones nowadays have an increasing number of functions. Apart from a normal telephone call, in the case of which the number of the subscriber to be called is simply entered, there is the possibility of calling subscribers by means of name functions. Furthermore, many telephones have redialling and answer-machine functions. In the use of such a telephone, and even more so in its programming, the user is expected to find his way around in a complex menu structure. A user usually gets the assistance he needs for operating his telephone only from the operating instructions, which however are not readily at hand or cannot be read in every situation. A particular difficulty arises here, for example, in the case of telephones which are installed in a car and are used while driving. While the daily functions such as dialling a number or dialling up a subscriber by means of his name are undoubtedly familiar to every owner, this may indeed present a problem for the user who owns a different telephone. The more complex functions, such as storing names with associated telephone numbers or listening to answer-machine messages, however, undoubtedly require some concentration even for the practised user. Specifically when driving a car, however, a telephone user should not be distracted too much by operating his telephone. For this reason, today there are already car phones which are operated by voice control, without the actuation of any buttons.

Specifically in the voice-controlled operation of a telephone or a similar device with a complex menu structure, increased concentration is required to enter the next operating step correctly. One reason for this is that, for the voice-controlled system, no visual display means or different operating buttons are provided and another reason is therefore that it has to be possible to perform not just one function but many functions.

SUMMARY OF THE INVENTION

Therefore, the object of the present invention is to make it easier for a user to operate the telephone, even if he is not familiar with the menu structure or no longer knows where he is in the menu at a given time.

In the case of the process according to the invention for interactive communication between a voice dialling system, provided for a telephone, and its user by means of a stored program, the system outputs to the user, when he inputs a help signal, a program branch previously selected by him and the next options available to him within this program branch. In this case, the previously selected program branch may be the last one selected.

A voice dialling system according to the invention for interactive communication between a telephone and its user by means of a program indicates to the user when he inputs a help signal a program branch previously selected by him and the next options available to him within this program branch and includes a memory device for storage of the program, an input unit for input of a help signal, a control device for execution of the program and an output device for output of the next options available to the user. In this case, the voice dialling system may be separate from the telephone or else be integrated into the telephone.

Such a process and/or such an apparatus makes it possible for a user to find his way around in a complex menu structure without having to concentrate on the menu, i.e. on operating the unit. If he inputs the help signal, the voice dialling system tells him where he is in the menu at a given time and which next inputs are possible. As a result, a user does not need to learn the complex menu by heart and he also does not always need to remember at which point in the menu he is at a given time if he would like to interrupt operating the unit for a while. Furthermore, use is made possible and/or simplified for occasional users who are not familiar with the menu. If, for example, after switching on, the voice dialling system is in the main menu, it can be established by means of the help signal which next steps are possible, even for example just to input and confirm a number for a subscriber. The invention can be used in principle with every type of telephone, thus for example with line-bound or cordless telephones, with radio telephones, hand-held phones or with telephones which are installed in other equipment, for example in fax machines. The voice dialling system is to be understood as meaning an acoustically operable system for controlling different functions of the telephone, for example for controlling a telephone-number dialling operation, for controlling the storing operation of abbreviated dialling elements etc.

An advantageous refinement of the process according to the invention is characterized in that the help signal can be input acoustically.

This possibility of acoustic input of the help signal has the effect that a user need not do without the convenience of not having to actuate any buttons when operating the telephone. In particular, it makes trouble-free operation possible in an environment in which the telephone user is not to be distracted by looking for and actuating buttons of his telephone.

A further advantageous refinement of the process according to the invention is characterized in that the indication of the voice dialling system can be output acoustically.

This possibility of acoustic output of the help and status information, which indicates to the user the progam branch previously selected by him and the next options available to him within this program branch, makes operation possible in an environment in which the user is not to avert his gaze during certain situations.

Another advantageous refinement of the process according to the invention is characterized in that the indication of the voice dialling system can be output optically by means of a display.

A possibility of optical output achieves the effect that a user can quickly register the information indicated to him.

The acoustic and optical indication of the voice dialling system may also be advantageously combined. In such a case, a user can register the indication just acoustically if it is not possible for him to look at a display at a given time. If, however, it is possible for him, he can register the information of the voice dialling system in the quickest possible way by the acoustic and at the same time optical indication.

BRIEF DESCRIPTION OF THE DRAWING

An exemplary embodiment of the invention is described in more detail below in conjunction with the attached drawings, in which:

FIG. 1 shows an overview of the function of a voice dialling system installed in a car, FIG. 2 shows a main menu of the voice dialling system with integrated HELP function, FIG. 3 shows a HELP submenu for the main menu according to FIG. 2, FIG. 4 shows a NUMBER submenu of the main menu according to FIG. 2, FIG. 6 shows a REDIAL submenu of the main menu according to FIG. 2, FIG. 14 shows the interaction between audio software and monitoring software in the voice dialling system, FIG. 15 shows components of the audio software of the prior art voice dialling system according to FIG. 14.

DETAILED DESCRIPTION OF THE INVENTION

Figure 5:
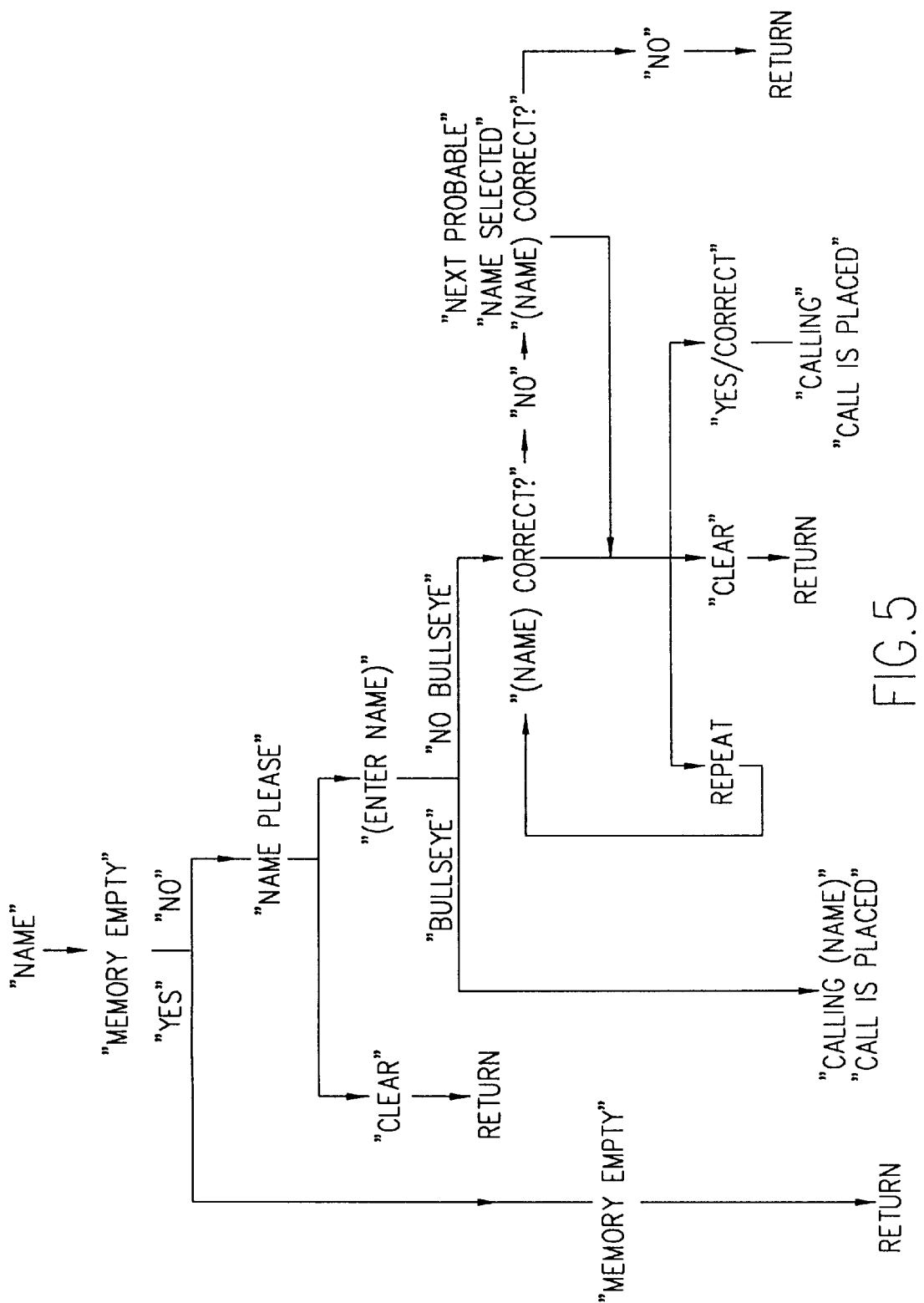
FIG. 5 shows a NAME submenu of the main menu according to FIG. 2.
Figure 8:
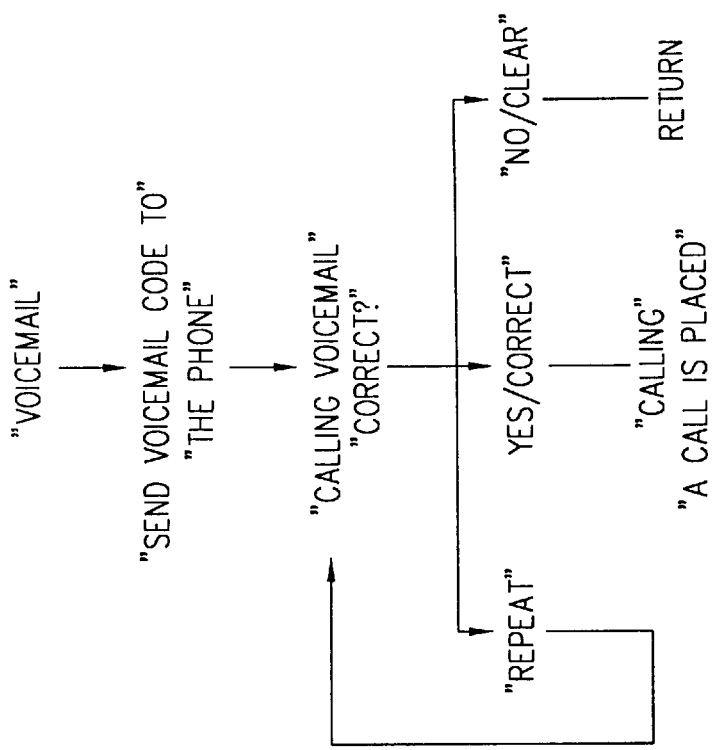
FIG. 8 shows a VOICEMAIL submenu of the main menu according to FIG. 2.
Figure 7:
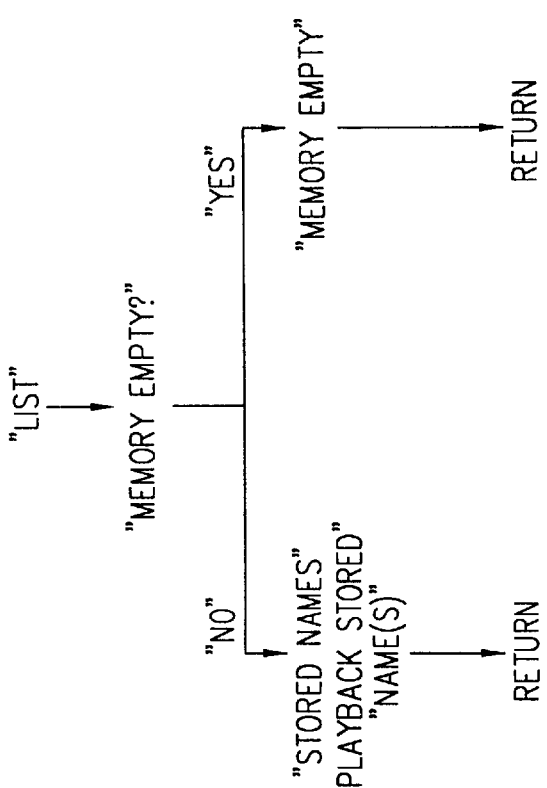
FIG. 7 shows a LIST submenu of the main menu according to FIG. 2.
Figure 9:
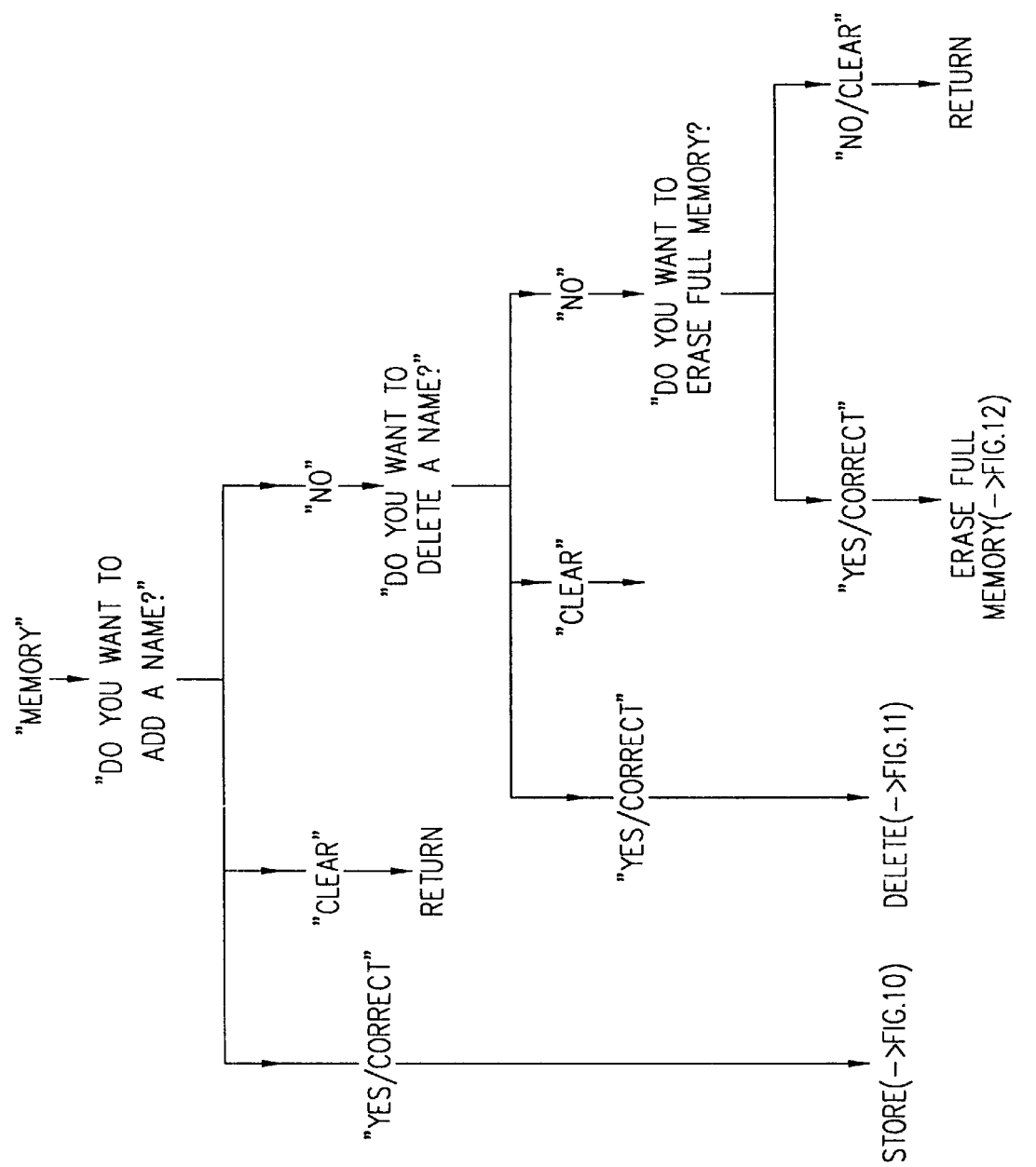
FIG. 9 shows a MEMORY submenu of the main menu according to FIG. 2.
Figure 10:
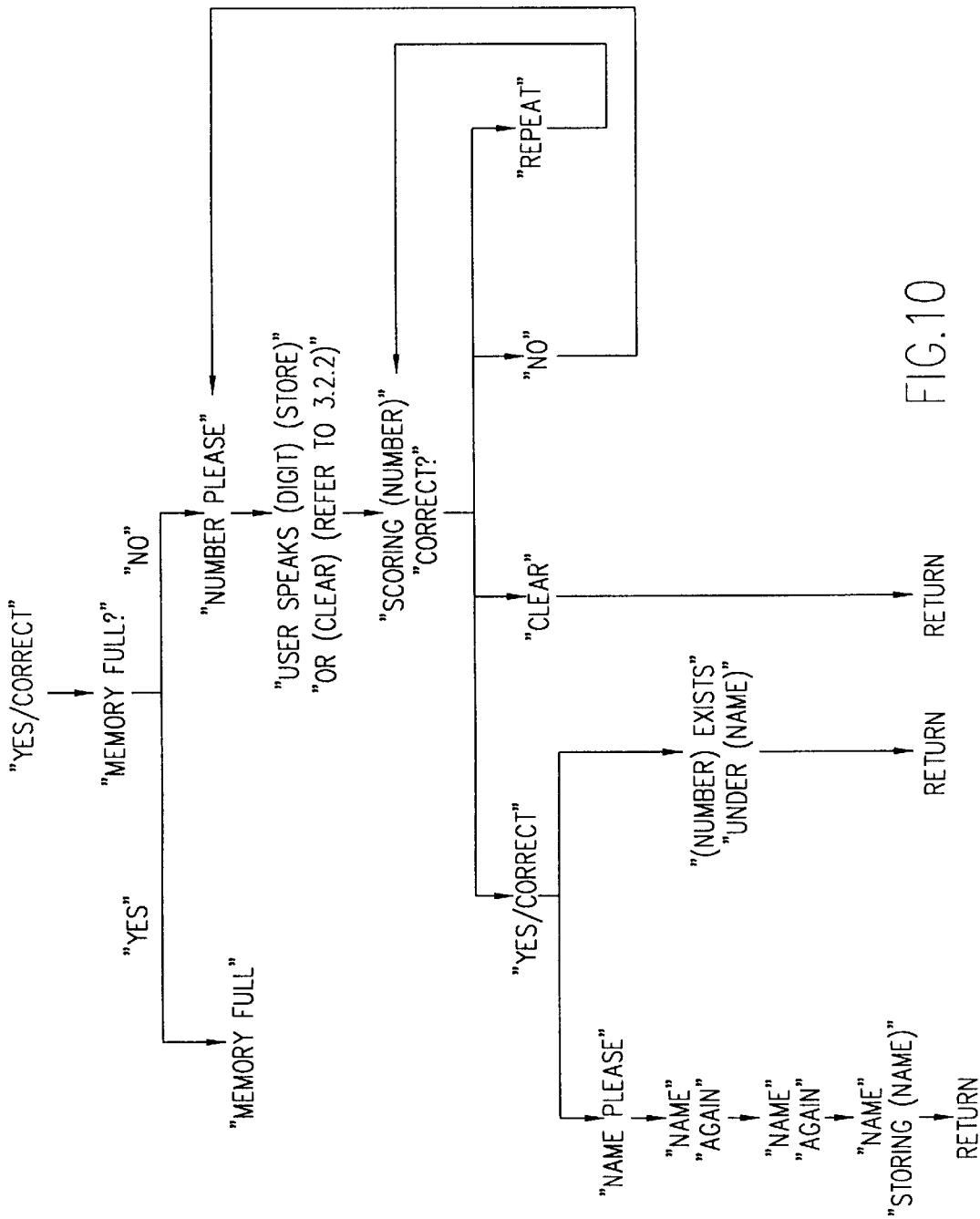
FIG. 10 shows a MEMORY-STORE submenu of the MEMORY submenu according to FIG. 9.
Figure 11:
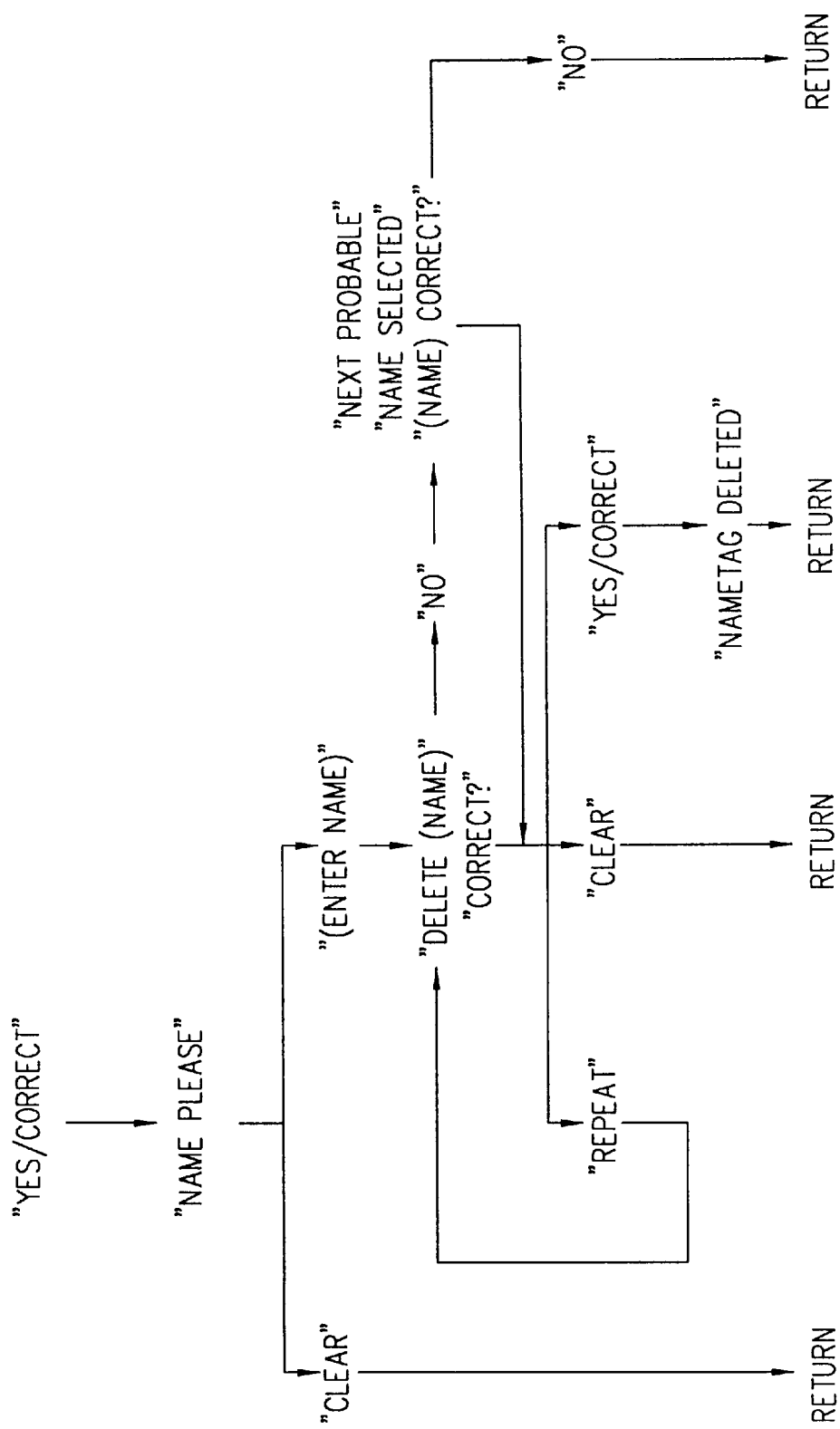
FIG. 11 shows a MEMORY-DELETE submenu of the MEMORY submenu according to FIG. 9.
Figure 12:
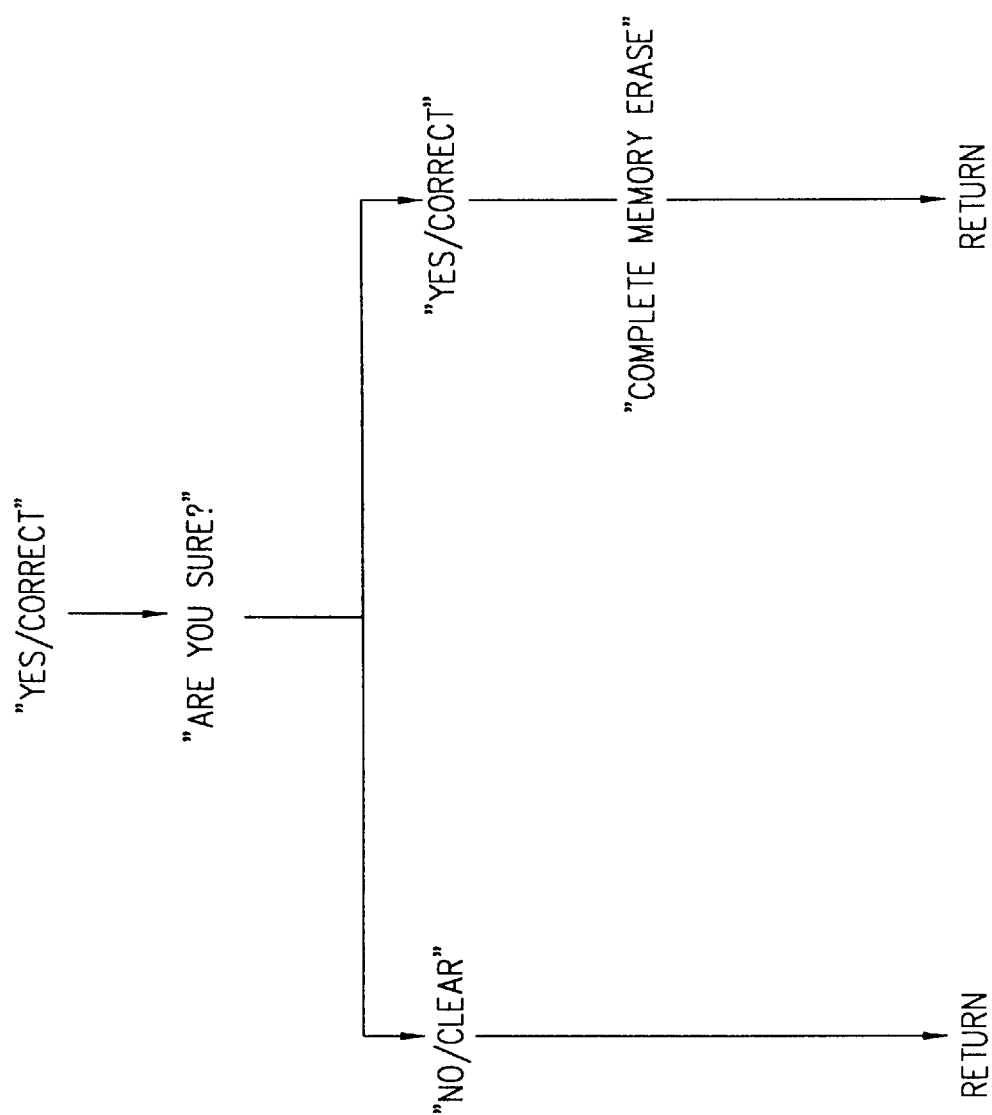
FIG. 12 shows a MEMORY-ERASE FULL MEMORY submenu of the MEMORY submenu according to FIG. 9.

FIG. 1 shows an overview of the function of a telephone voice dialling system installed in a car. This figure reveals that the voice dialling system provides the link between a telephone user and the telephone. The interface between the user and the voice dialling system is in this case an acoustic one. This means that the voice dialling system records information from the user by means of a microphone and sends information to him by means of a loudspeaker. With the aid of the information recorded by means of the microphone and possibly using a request sent by means of the loudspeaker for this information to be repeated or supplemented, the voice dialling system operates the telephone. Possible input requests from the telephone are acoustically passed on to the user via the voice dialling system. The telephone may be connected, for example, to the voice dialling system by means of a line or a radio link.

Since customary telephones nowadays, including those installed in cars, are very complex devices with many functions, and a user would like to make use of all the functions available, a voice dialling system must offer the possibility of being able to select these functions acoustically. For easier use of these many functions, such a voice dialling system contains, for example, a program which, in menu form, leads to individual functions. Such a menu form for a voice dialling system is represented by way of example in FIGS. 2 to 12. In FIGS. 2 and 3, the implementation of a HELP function according to the invention is also represented, while FIGS. 4 to 12 serve only to illustrate the complexity of a menu structure implemented in a voice dialling system. In FIGS. 2 to 12, the spoken input possibilities for a user are identified in each case by being in bold upper case letters and by inverted commas. If, for example, after switching on, the telephone and the voice dialling system are in the IDLE state, the user can get into the main menu of the voice dialling system by speaking the words "VOICE CONTROL". Here various code words are available to him to get into various submenus in which various functions of the telephone can respectively be activated. Such code words are, for example: "CLEAR", by which the system is reset to the IDLE state, "NUMBER", whereby the user gets into a submenu in which he can dial digit by digit, "NAME", by which the user gets into a submenu in which he can input a name for a subscriber whose number is preprogrammed and can be dialled by the system itself on the basis of the preprogramming, "REDIAL", whereby the user gets into a submenu in which he has access to the list of numbers last dialled by the telephone and in which he can select one of these numbers for dialling, "LIST", whereby the user gets into a submenu in which all the names stored in the system are output to him, "VOICEMAIL", by which the user gets into a submenu in which he can be connected to his mailbox, and "MEMORY", by which the user gets into a submenu in which he can store and erase user-dependent assignments of names to call numbers. Even with this still very easy-to-follow main menu of a voice dialling system, it becomes clear that a user of such a system very probably will not always know by heart where he is in the menu structure at a given time or which next options are available to him at a given time. Therefore, according to the invention there is implemented in the main menu of FIG. 2 a help function which, after an acoustic "HELP" input by the user, outputs to the latter all the command words then possible for input. This output is represented in FIG. 3. In this case of help for the main menu, only the command words available are output, and not also that the user is already in the main menu. The output may take place acoustically, optically or as a combination of acoustically and optically. If the user inputs the command word "HELP" at any other point within the menu, it is also indicated to him, in addition to the next possible command words which can be input, where he is in the menu structure at a given time, in order that he can establish a reference to the command words which can be input.

For the sake of overall clarity, the help functions are not shown in FIGS. 4 to 12. These FIGS. 4 to 12 relate to the known menu structure of a voice dialling system and are not to be explained in any more detail here.

Figure 13:
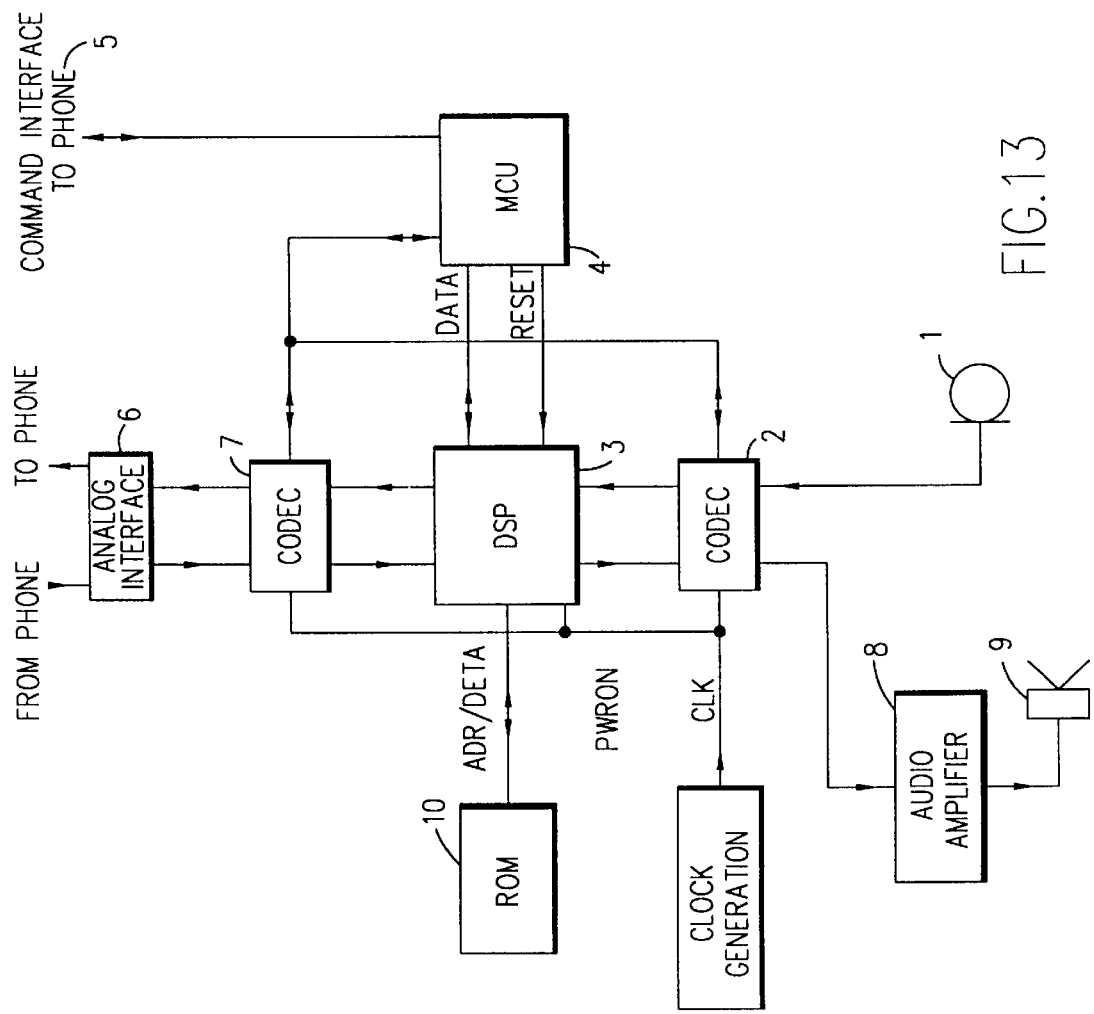
FIG. 13 shows a block diagram of the voice dialling system.

FIG. 13 shows the block diagram of the voice dialling system. Here it is illustrated how an acoustically input command reaches a telephone, enabling the telephone to output acoustically an input request to a user, and enabling the user to communicate with a subscriber by means of the voice dialling system and the telephone. Commands acoustically input into a microphone 1 are decoded by means of a codec module 2 in connection with a digital signal processor 3 and are passed via a microcontroller unit 4 to a command interface 5 of the telephone. For communication between two subscribers, after the digital signal processor 3, the spoken word is converted back again by means of a codec module 7 and fed into the telephone by an analogue interface 6. Voice coming in via the telephone from a subscriber talking to the user is directed via the analogue interface 6 and the codec module 7 to the digital signal processor 3 and passes from there via the codec module 2, an audio amplifier 8 and a loudspeaker 9 to the user. The voice dialling system has a ROM 10, which is connected to the signal processor 3 and in which the menu structure for operating the telephone functions is stored. Clock signals pass from a clock signal generator 11 to the codecs 2 and 7 and also to the DSP 3.

In FIG. 13, audio software is processed in the digital signal processor 3 and monitoring software is processed in the microcontroller unit 4. The interaction between this audio software and monitoring software is represented in FIG. 14. The user communicates with the audio software and the telephone communicates with the monitoring software. Commands are exchanged between these two software packages. By this structure, voice recognition software and software which is required during the telephone call are separated by the software which establishes the connection set-up for the telephone call. The user can thus speak commands into the microphone of the voice dialling system and the said commands are converted by the audio software and sent to the monitoring software. Finally, the connection for the telephone call is set up by the monitoring software. Thus, the audio software can be adapted to a user independently of the monitoring software, and the monitoring software can be adapted to a telephone independently of the audio software.

FIG. 15 shows the components of the prior art audio software. A word spoken by the user for the connection set-up or for the input of other commands passes to the voice recognition software. There, it is converted for the menu software, within which there is also a control module for the monitoring software. The menu software in turn can send requests to the user by means of voice output software. Such requests may comprise, for example, the repeating or supplementing of a command which has just been spoken. Once a connection has been set up, the words set up by the user pass to the software during the telephone call.

Figure 16:
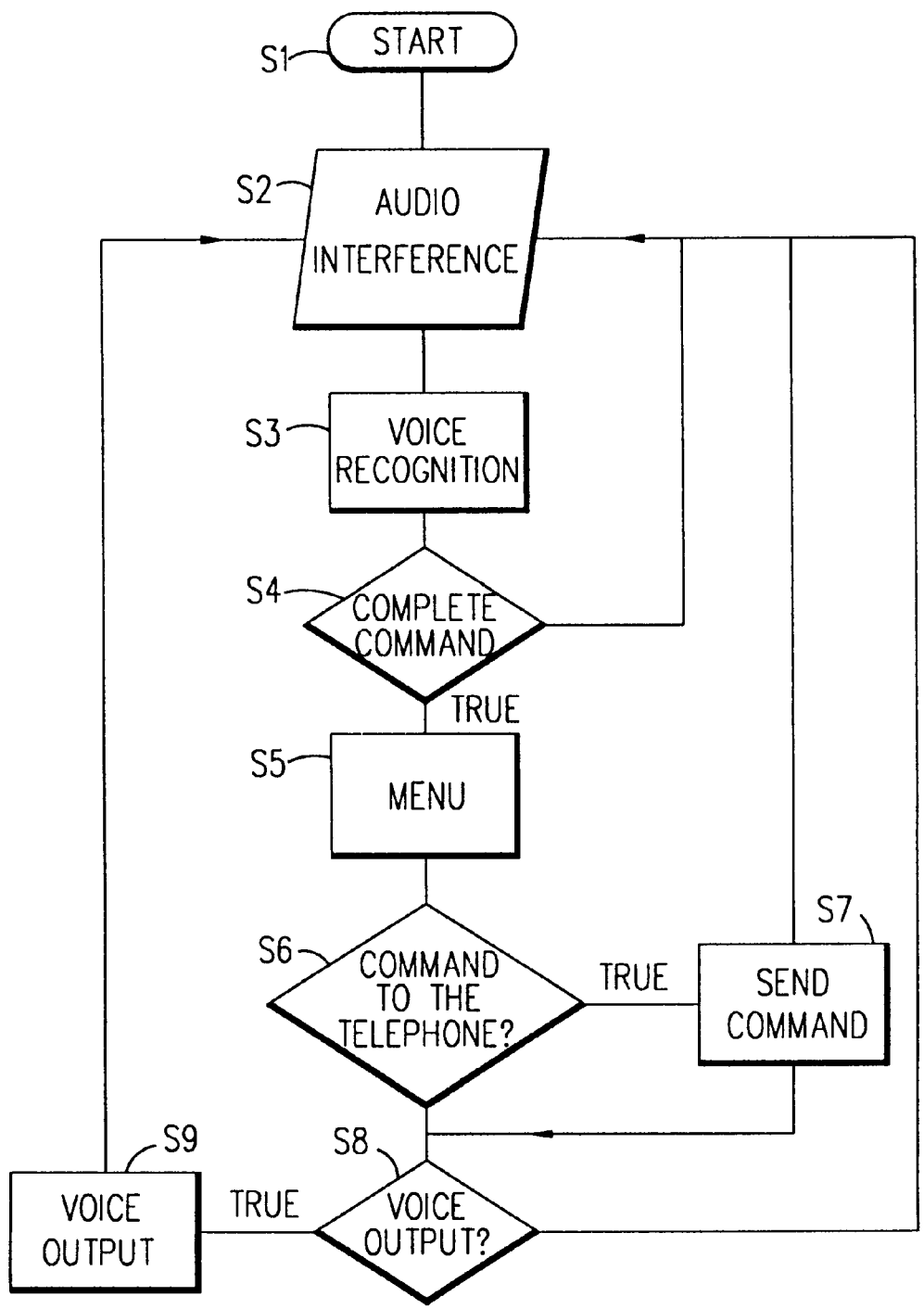
FIG. 16 shows the program flow of the prior art voice dialling system from FIG. 13.

Of central significance for a voice dialling system is the menu software. After a user input, the menu module decides what is to be done next. This is dependent on the previous inputs. The interaction between the three modules of voice recognition, voice output and the menu can be seen in FIG. 16, which shows a program flowchart of the prior art voice dialling system. After the start in step S1, the program is at the audio interface in step S2. The audio interface sends all the spoken words to the voice-recognition step S3. Here, the spoken words are converted into a form intelligible for the digital signal processor. In step S4, it is decided whether a complete command is present. If this is not the case, the program returns to the audio-interface step S2. If a complete command is present, the program passes to step S5, in which the menu converts the command. In step S6, it is decided whether the command is to be sent to the telephone or whether the user is simply to be moved on in the menu by this command. If the command is to go to the telephone, it is sent to the latter in step S7 and the program branches either into the audio-interface step S2 or into the checking-for-voice-output step S8, depending on the command. The program also goes into this step S8 if the user is only moved on in the menu by his input command. Here it is decided whether or not the voice dialling system is to perform a voice output. If this is not to happen, the program returns to the audio-interface step S2. If a voice output is to be performed, this is done in step S9, before the program also returns in this way to the audio-interface step S2. From the audio-interface step S2, the program can only return to the voice-recognition step S3. It is thus in an endless loop, from which it comes out again only by switching off the voice dialling system or input of the "CLEAR" command.

Figure 17:
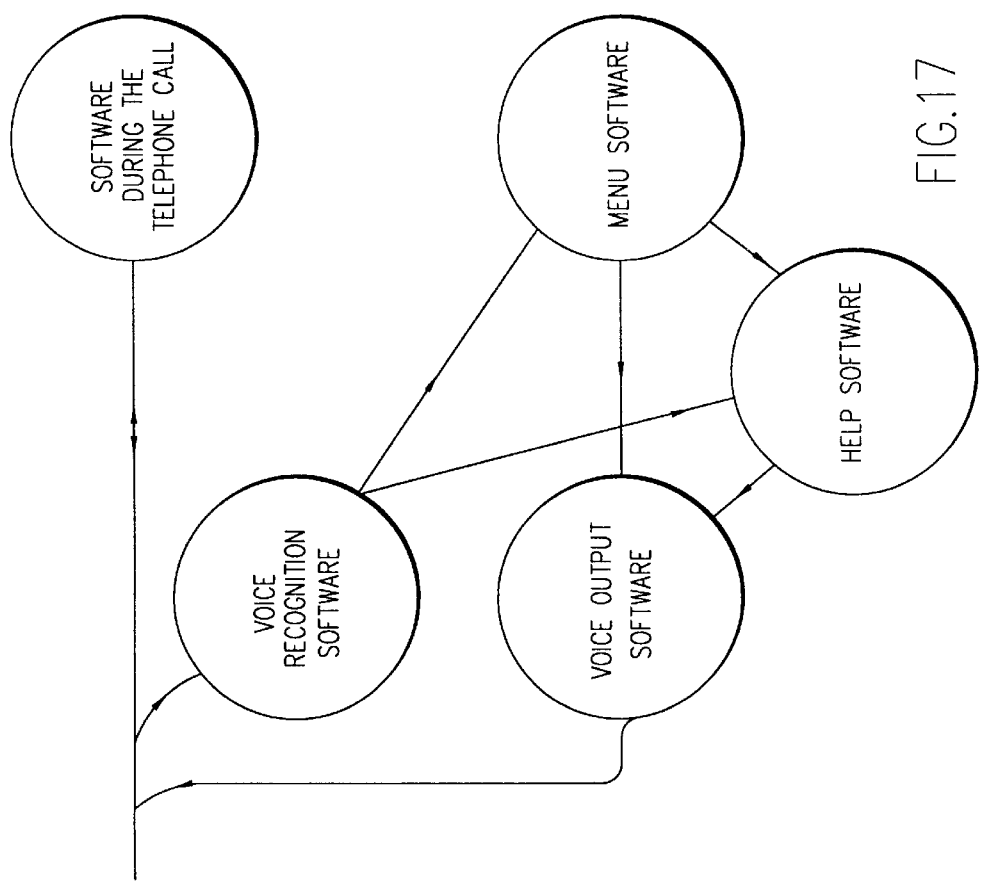
FIG. 17 shows components of the audio software of the voice dialling system according to FIG. 13 with a help module according to the invention.

FIG. 17 shows the components of the audio software with a help module implemented according to the invention. This help module is provided in addition to the components of the audio software (voice recognition software, menu software, voice output software and software during the telephone call) according to FIG. 15 and is arranged ahead of the voice output software such that it is possible to branch either from the voice recognition software directly or from the menu software into the help software, which then for its part can access the voice output software. In this case, the menu software can still also access the voice output software directly.

Figure 18:
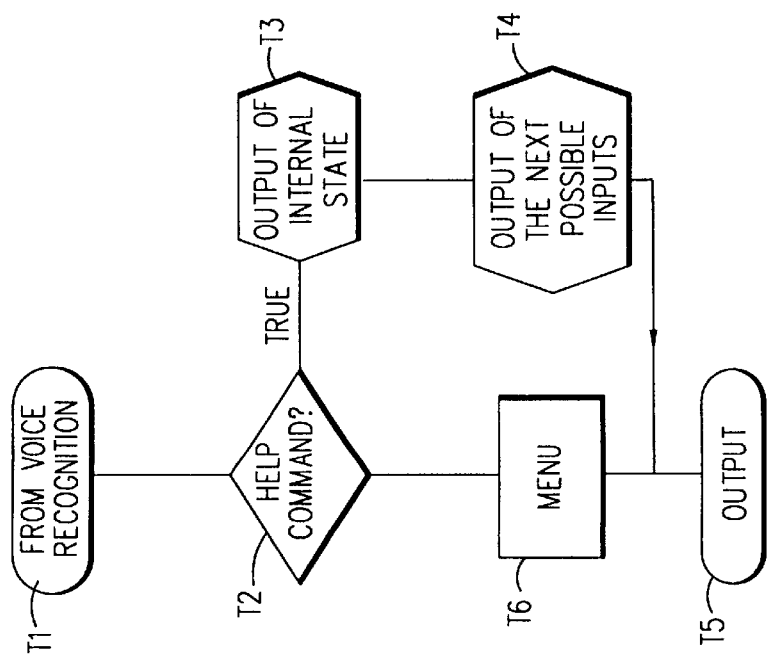
FIG. 18 shows a detail from the program flowchart of the voice dialling system according to FIG. 13 with implemented help module according to the invention.

FIG. 18 shows a detail from the program flow-chart of the voice dialling system with a help module (T2, T3, T4) implemented according to the invention. If a help command is passed on by the voice recognition in step T1 and is recognized in step T2, in step T3 the output of the internal state is established and in step T4 that of the next possible inputs, which are output in step T5. A subsequent command can pass from the voice recognition in step T1 to the menu in step T6 in the next program run only if it is established in step T2 that it is not a help command.

Figure 20:
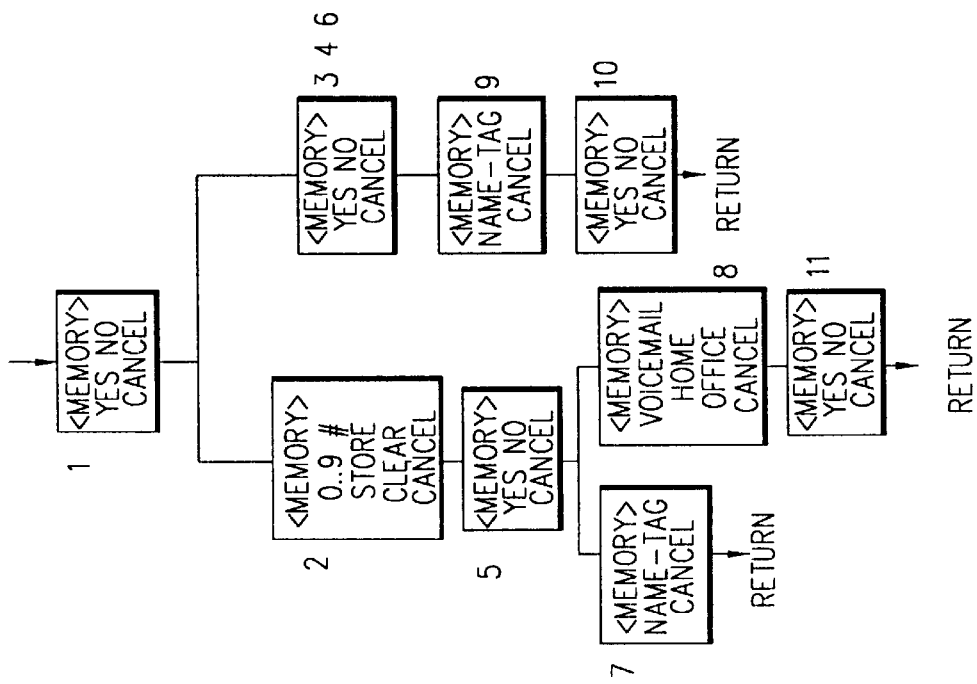
FIG. 20 shows an example of the help and status information at the markings 1 to 11 of FIG. 19.
Figure 19:
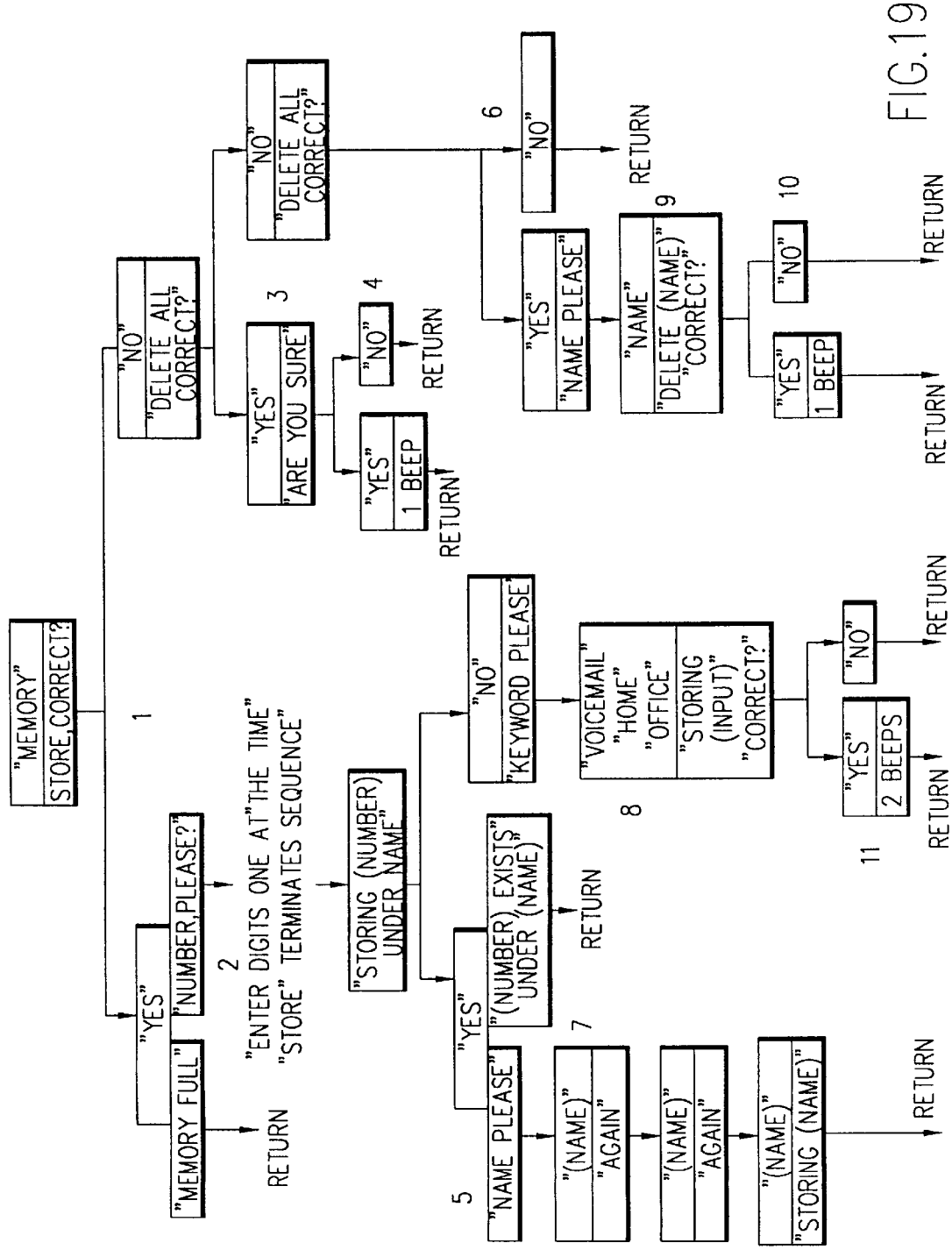
FIG. 19 shows an example of a MEMORY submenu with markings 1 to 11, in which the help function can be activated.

FIGS. 19 and 20 finally show by way of example for a "MEMORY" submenu the outputs of the voice dialling system possible at each branching or input point of the submenu when the "HELP" signal is input. If, for example, the user is at point 1 and requests help, the voice dialling system outputs the words MEMORY, YES, NO, CANCEL. At point 2, accordingly MEMORY, 0 . . . 9*#, STORE, CLEAR and CANCEL would be output. At points 3 to 6, and also 10 and 11, the system outputs MEMORY, YES, NO and CANCEL. At points 7 and 9, if help is requested, MEMORY, NAME-TAG and CANCEL is output. As the last help function in the "MEMORY" submenu, at point 8 MEMORY, VOICEMAIL, HOME, OFFICE and CANCEL is output.

Such a voice dialling system with help function can of course be used not only for car telephones but also for normal stationary telephone systems, for hand held phones or cordless telephones of any type, and also for telephones in fax machines. In this case, the voice dialling system may be located within these devices or be provided separately from them.

What is claimed is:

1. A process for interactive communication between a voice dialing system, provided for a telephone, and a user by means of a program which indicates to the user when he inputs a help signal, the program including a program branch previously selected by the user, and wherein the program branch includes further options available to the user within said program branch, the process comprising the steps of:

providing a plurality of menus, each of said menus listing a plurality of functions, wherein said plurality of menus includes a first menu, a second menu and a third menu, said second menu and said third menu being branches of said first menu;

identifying each menu by an identifying word;

in response to a speaking of a menu-identifying word to said system, selecting one of said menus;

in response to the speaking of a help command, presenting all functions of a selected menu audibly or visually, wherein said selected menu is any one of said first and said second and said third menus;

in response to the speaking of a function-identifying word to said system, selecting a function within one of said menus; and in response to the speaking of a number or name to said system, entering the number or name for implementing a selected function.

2. Process according to claim 1, characterized in that the help signal can be input acoustically.

3. Process according to claim 1, characterized in that the indication can be output acoustically.

4. Process according to claim 1, characterized in that the indication can be output optically by means of display.

5. Voice dialing system for interactive communication between a telephone and a user by means of a program which indicates to the user when he inputs a help signal, the system storing a program branch previously selected by the user, and, wherein said system provides further options available to the user within said program branch, said system comprising:

a memory device for storage of the program;

an input unit for input of a help signal;

a control device for execution of the program; and an output device for output of further options available to the user;

wherein the system is operative to output from said memory one of a set of a plurality of menus of said program selected in response to a voice menu-identifying word spoken by the user, wherein said plurality of menus includes a first menu, a second menu and a third menu, said second menu and said third menu being branches of said first menu, and each of said menus being identified by an identifying word;

said memory stores a list of functions for each of a plurality of menus of said set of menus; and wherein said system is operative to output from said memory a function selected in response to a function spoken by the user, said system implementing a selected function in accordance with the following procedural steps:

in response to a speaking of a menu-identifying word to said system, selecting one of said menus;

in response to the speaking of a help command, presenting all functions of a selected menu audibly or visually, wherein said selected menu is any one of said first and said second and said third menus;

in response to the speaking of a function-identifying word to said system, selecting a function within one of said menus; and in response to the speaking a of data-identifying word to said system, entering data for implementing a selected function.

6. Voice dialling system according to claim 5, characterized in that it is arranged in the telephone.

7. A process for interactive communication between a voice dialing system, provided for a telephone, and a user by means of a program, said program having a plurality of menus identified by an identifying word, respectively, each of said menus containing a plurality of optional functions of which a function is activated by the speaking of a function-identifying word, the process comprising the steps of:

providing a plurality of menus, each of said menus listing a plurality of functions, wherein said plurality of menus includes a first menu, a second menu and a third menu, said second menu and said third menu being branches of said first menu;

in response to a speaking of a menu identifying word to said system, selecting one of said menus;

in response to the speaking of a help signal word into the system during a running through of a selected menu, indicating to the user in response to the help signal word the identifying word of the selected menu as well as the next optional functions of said menu.

8. Voice dialing system for interactive communication between a telephone and a user by means of a program, said program having a plurality of menus identified by an identifying word, respectively, each of said menus containing a plurality of optional functions, said system comprising:

a memory device for storing said program;

an input unit for input of a help signal word;

a control device for execution of the program; and an output device for output of menu-identifying words, menus and further optional functions available to the user;

wherein the system is operative to output from said memory device one of a set of a plurality of menus of said program selected in response to a voice menu-identifying word spoken by the user, wherein said plurality of menus includes a first menu, a second menu and a third menu, said second menu and said third menu being branches of said first menu, and each of said menus being identified by an identifying word; and wherein said system is operative to present, in response to the help signal entered during a running through the selected menu, the next optional functions of said menu.

* * * * *